United States Patent
Kirkpatrick (12)

(10) Patent No.: US 9,179,211 B2
(45) Date of Patent: *Nov. 3, 2015

(54) DOUBLE SEAL MOLDABLE EARPIECE SYSTEM

(71) Applicant: Decibullz LLC, Loveland, CO (US)

(72) Inventor: Kyle J Kirkpatrick, Loveland, CO (US)

(73) Assignee: Decibullz LLC, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,332

(22) Filed: Feb. 2, 2015

(65) Prior Publication Data

US 2015/0146909 A1     May 28, 2015

Related U.S. Application Data

(63) Continuation-in-part of application No. 13/761,947, filed on Feb. 7, 2013.

(60) Provisional application No. 61/596,567, filed on Feb. 8, 2012.

(51) Int. Cl.
*H04R 25/00*     (2006.01)
*H04R 1/10*     (2006.01)

(52) U.S. Cl.
CPC ............ *H04R 1/1058* (2013.01); *H04R 1/1016* (2013.01); *H04R 25/652* (2013.01)

(58) Field of Classification Search
USPC ........................................................ 381/328
See application file for complete search history.

(56) References Cited

U.S. PATENT DOCUMENTS

| | | | |
|---|---|---|---|
| 2,430,229 A | * | 11/1947 | Kelsey ........................ 381/338 |
| 4,412,096 A | | 10/1983 | Edgerton et al. |
| 4,880,076 A | | 11/1989 | Ahlberg et al. |
| 5,002,151 A | | 3/1991 | Oliveira et al. |
| 5,185,802 A | | 2/1993 | Stanton |

(Continued)

FOREIGN PATENT DOCUMENTS

| | | |
|---|---|---|
| EP | 0895703 | 2/1999 |
| EP | 1032243 | 8/2000 |

(Continued)

OTHER PUBLICATIONS

U.S. Appl. No. 61/596,567, filed Feb. 8, 2012.

(Continued)

*Primary Examiner* — Davetta W Goins
*Assistant Examiner* — Amir Etesam
(74) *Attorney, Agent, or Firm* — Craig R. Miles; CR Miles P.C.

(57) ABSTRACT

An earpiece including an external surface having a first fixed configuration disposable within the outer ear and having a passage adapted for retention of an in ear device a portion of which extends outwardly to releasably couple to an earplug adjacent the earpiece, the earpiece heatable to achieve a moldable condition which allows reconfiguration of the external surface by engagement with the outer ear to dispose the external surface in a second fixed configuration in greater conformity to the outer ear.

13 Claims, 13 Drawing Sheets

(56) References Cited

U.S. PATENT DOCUMENTS

| | | | |
|---|---|---|---|
| 5,321,757 | A | 6/1994 | Woodfill, Jr. |
| 5,718,244 | A * | 2/1998 | Thornton ................ 128/864 |
| 5,881,159 | A | 3/1999 | Aceti et al. |
| 6,310,961 | B1 | 10/2001 | Oliveira et al. |
| 6,354,990 | B1 | 3/2002 | Juneau et al. |
| 6,434,248 | B1 | 8/2002 | Juneau et al. |
| 6,595,317 | B1 | 7/2003 | Widmer et al. |
| 6,761,789 | B2 | 7/2004 | Juneau et al. |
| 7,130,437 | B2 | 10/2006 | Stonikas et al. |
| 7,217,335 | B2 | 5/2007 | Juneau et al. |
| 7,403,629 | B1 | 7/2008 | Aceti |
| 7,627,131 | B2 | 12/2009 | Nielsen et al. |
| 7,778,434 | B2 | 8/2010 | Juneau et al. |
| 8,027,638 | B2 | 9/2011 | Sanguino et al. |
| D656,129 | S | 3/2012 | Kelly et al. |
| 8,184,838 | B2 | 5/2012 | Solomito et al. |
| 8,201,561 | B2 | 6/2012 | Blanchard |
| 8,280,093 | B2 | 10/2012 | Siahaan et al. |
| 2001/0043708 | A1* | 11/2001 | Brimhall ................ 381/328 |
| 2005/0147269 | A1 | 7/2005 | Oliveira et al. |
| 2006/0098833 | A1 | 5/2006 | Juneau et al. |
| 2008/0187161 | A1 | 8/2008 | Tiemens et al. |
| 2009/0041287 | A1* | 2/2009 | Quinlisk ................ 381/380 |
| 2009/0232342 | A1 | 9/2009 | Oliveira et al. |
| 2009/0252362 | A1 | 10/2009 | Ooi et al. |

FOREIGN PATENT DOCUMENTS

| | | |
|---|---|---|
| EP | 2107827 | 10/2009 |
| WO | WO 92/03894 | 3/1992 |
| WO | WO 99/31935 | 6/1999 |
| WO | WO 2012/024656 | 2/2012 |

OTHER PUBLICATIONS

U.S. Appl. No. 13/761,947, filed Feb. 7, 2013.

PCT Interantional Patent Application No. PCT/US2013/025288, filed Feb. 8, 2013.

Angell. PodFitKit for Apple earbuds announced. iLounge, website, http://www.ilounge.com, originally downloaded Dec. 31, 2012, 4 total pages.

E-Bay. New Sugru Black 3 pack Moldable Self Setting Rubber Customize Your Earbuds. Website, http://www.ebay.com, originally downloaded Dec. 31, 2012, 4 total pages.

Fuze Custom Earphones. On-line Catalog, http://www.earfuze.com, originally downloaded Dec. 31, 2012, 1 page.

How-To Geek. How to Make Custom Silicone Ear Molds for Your In-Ear Monitors. Website, http://www.howtogeek.com, originally downloaded Dec. 31, 2012, 20 total pages.

Lloyds. Custom Ear Mold—Standard. On-line Catalog, http://lloydhearingaid.com, originally downloaded Dec. 31, 2012, 1 page.

mylobie.com. Lobies—comfortable earbuds adapters for iPod, iPhone, and portable audio.Website, http://www.mylobie.com, originally downloaded Dec. 31, 2012, 1 page.

Zapconnect. Hearing Aid Moldable Impression Silicone Putty. Website, http://www.zapconnect.com, originally downloaded Dec. 31, 2012, 1 page.

Zenplugs Moulded Earplug Shop. Zenpods Blue Molded Earphone Adaptors . . . On-line Catalog, http://shop.zenplugs.com, originally downloaded Dec. 24, 2013, 1 page.

PCT Interantional Patent Application No. PCT/US2013/025288; ISR mailed Jun. 2, 2013, 11 total pages.

* cited by examiner

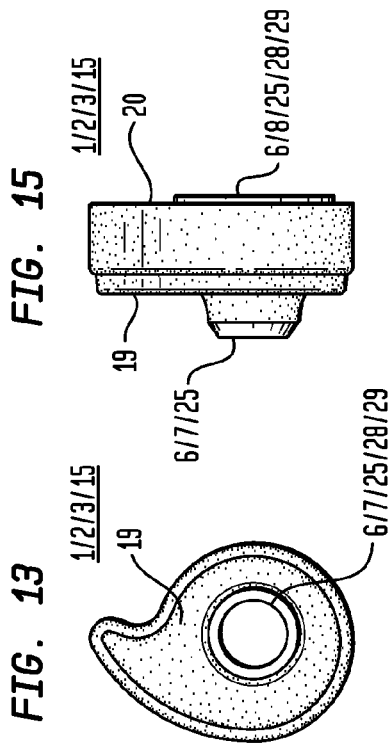
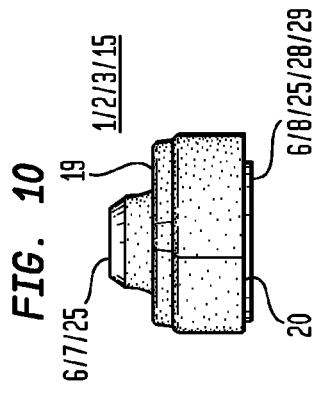
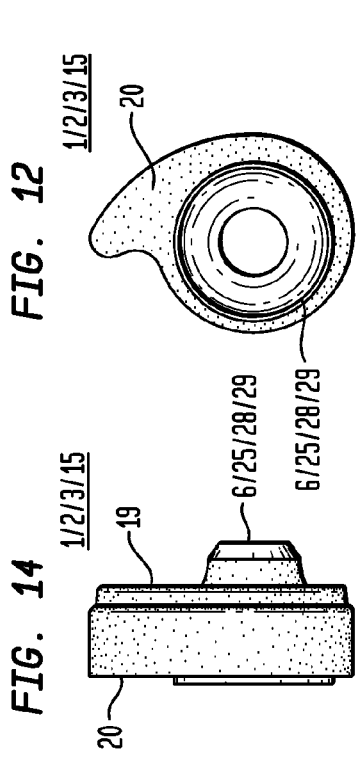
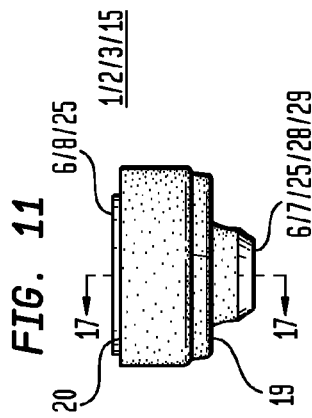

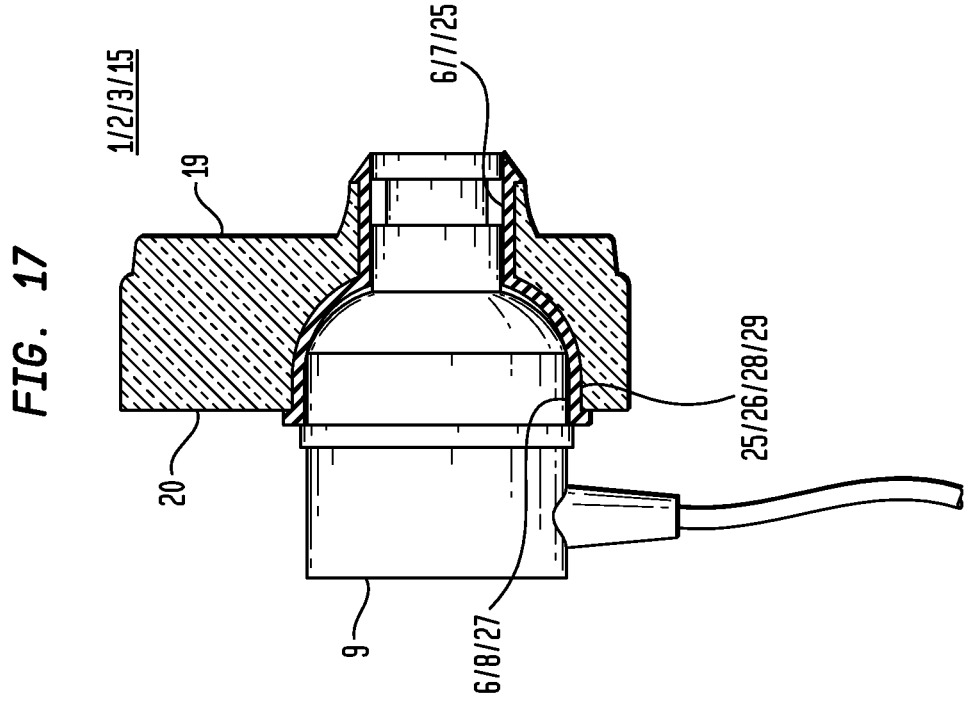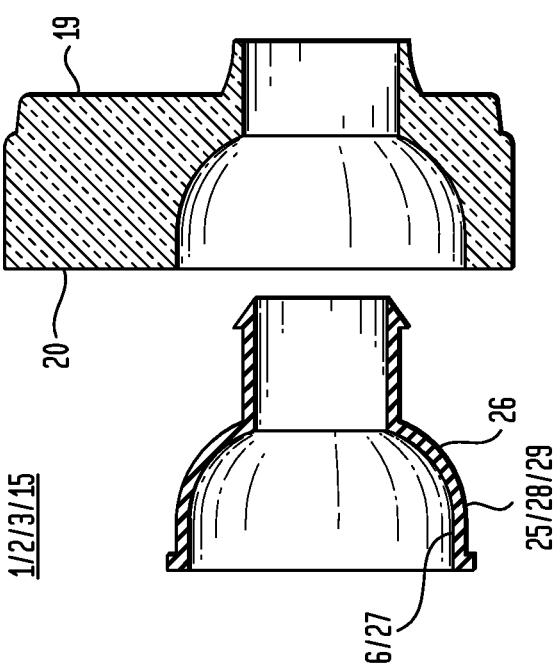

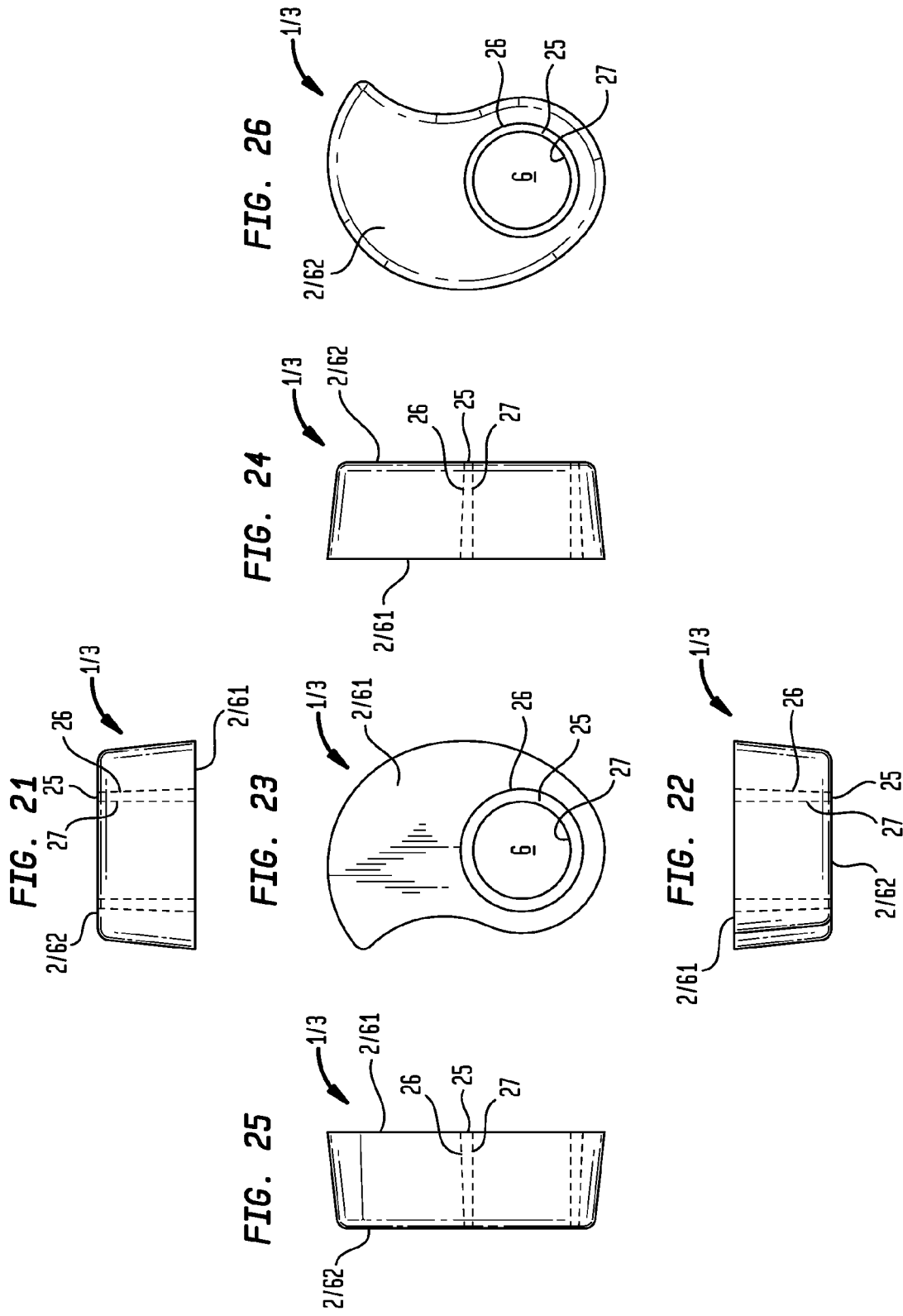

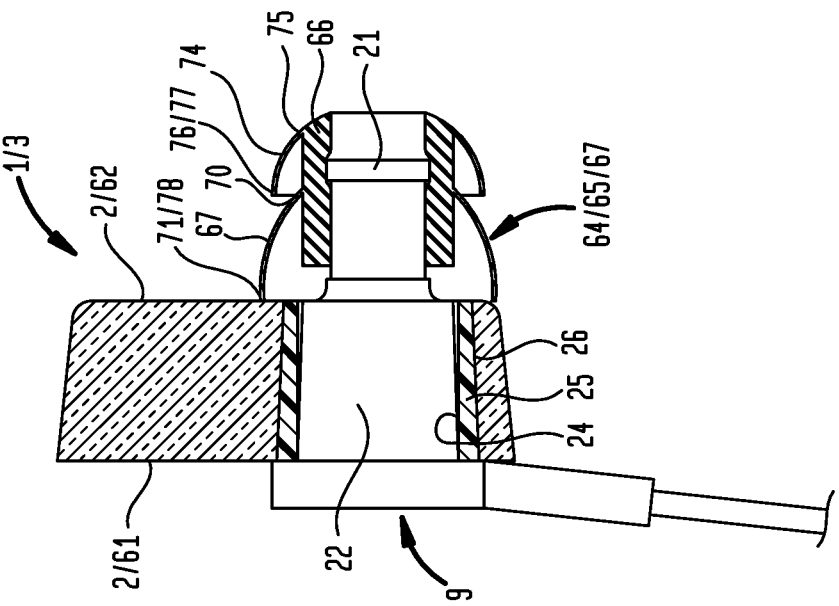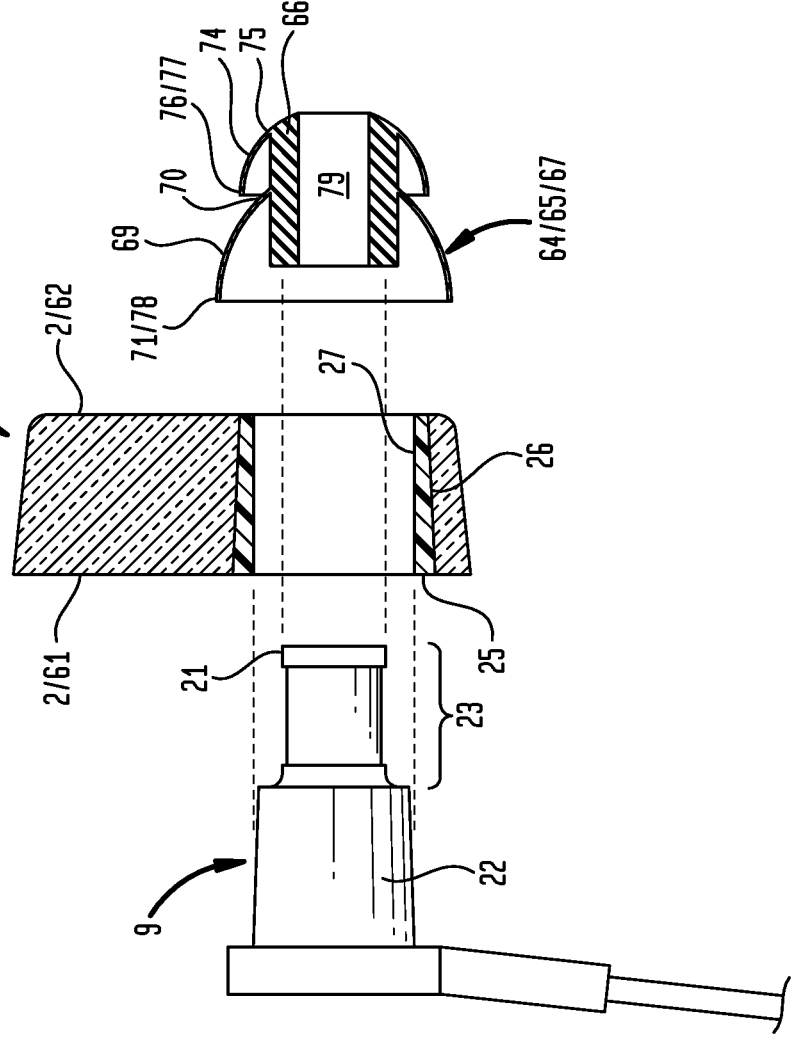

DOUBLE SEAL MOLDABLE EARPIECE SYSTEM

This United States Patent Application is a continuation-in-part of U.S. patent application Ser. No. 13/761,947, filed Feb. 7, 2013, which claims the benefit of U.S. Provisional Patent Application No. 61/596,567, filed Feb. 8, 2012, hereby incorporated by reference herein.

I. TECHNICAL FIELD

An earpiece including an external surface having a first fixed configuration disposable within the outer ear and having a passage adapted for retention of an in-ear device. The earpiece in the first fixed configuration heatable to achieve a moldable condition which allows reconfiguration of the external surface by engagement with the outer ear of a wearer to dispose the external surface in a second fixed configuration in greater conformity to the outer ear. The in-ear device can be retained in the passage of the earpiece in the second fixed configuration with a portion of the in-ear device extending outward of the earpiece to releasably couple to an earplug having a sound attenuation portion configured to conformably engage the ear canal wall. The earplug conformably engaged with the ear canal wall and the earpiece in the second fixed configuration engaged with the outer ear provides a barrier between the ear canal and the ambient environment to attenuate sound from the ambient environment.

II. BACKGROUND

A wide variety of apparatus which deliver sound to the ear such as medical equipment, headsets, hearing aids, cellular telephones, and the like include in part in-ear devices such as earphones, earplugs, earbuds, ear tips, ear tubes, or the like which are not configured to the outer ear of the individual wearer.

Because conventional in-ear devices are not configured to the individual wearer's outer ear, the in-ear device may not stay in fixed engagement with the outer ear, or the in-ear device may not align with the outer portion of the ear canal, or the in-ear device may be uncomfortable for the wearer to insert into or retain in the ear.

The instant invention provides a moldable earpiece which retains conventional in ear devices to overcome in whole or in part certain of the forgoing disadvantages associated with conventional in-ear devices.

III. SUMMARY OF THE INVENTION

Accordingly, a broad object of the invention can be to provide a moldable earpiece which includes an external surface disposed in a first fixed configuration disposable within the outer ear of an ear of a wearer and having a passage adapted for retention of an in-ear device which upon heating to a moldable condition allows reconfiguration of the external surface by engagement with the outer ear of a wearer and upon cooling disposes the external surface of the earpiece in a second fixed configuration having greater conformity with the outer ear of the wearer and which retains the in-ear device in the passage of the earpiece in the second fixed configuration with a portion of the in-ear device extending outward of the earpiece to releasably couple to an earplug having a sound attenuation portion configured to conformably engage the external ear canal wall.

Another broad object of the invention can be to provide a method of making a moldable earpiece for retention of an in-ear device which includes forming an earpiece to dispose the external surface in a first fixed configuration disposable within the outer ear of an ear and providing a passage adapted for retention of an in-ear device, the earpiece capable upon heating of achieving a moldable condition which allows reconfiguration of the external surface of the earpiece by engagement with an outer ear of an ear and upon cooling disposes the external surface in a second fixed configuration having greater conformity with the outer ear, the earpiece in the second fixed configuration capable of retaining the in-ear device in the passage of the earpiece with a portion of the in-ear device extending outward of the earpiece for releasable coupling of an earplug having a sound attenuation portion configured to conformably engage the ear canal wall.

Another broad object of the invention can be to provide a kit for production of an earpiece which retains an in-ear device and which has greater conformity with the wearer's outer ear, the kit including: a moldable earpiece having a passage adapted for retention of an in-ear device, the earpiece upon heating to a moldable condition allows reconfiguration of the external surface by engagement with the wearer's outer ear and upon cooling disposes the external surface in a second fixed configuration having greater conformity to the wearer's outer ear; an in-ear device configured to be releasably retained in the passage with a portion of the in-ear device extending outward of the earpiece; and an earplug which releasably couples to the portion of the in-ear device extending outward of the earpiece adjacent the earpiece, the earplug having a sound attenuation portion configured to conformably engage the ear canal wall concurrent with engagement of the earpiece in the second fixed configuration with the outer ear.

Another broad object of the invention can be to provide a method of molding an earpiece which retains an in-ear device by obtaining an moldable earpiece having an external surface disposed in a first fixed configuration disposable within the outer ear of an ear and having a passage adapted for releasable retention of the in-ear device and which by heating the earpiece to achieve a moldable condition allows reconfiguration of the external surface by engagement with the outer ear of the ear and by cooling the earpiece while engaged with the outer ear disposes the external surface in a second fixed configuration having greater conformity with the outer ear which releasably retains the in-ear device with a portion of the in-ear device extending outward of the earpiece allowing releasable coupling of the earplug with the portion of the in-ear device extending outward of the earpiece.

Naturally, further objects of the invention are disclosed throughout other areas of the specification, drawings, photographs, and claims.

IV. A BRIEF DESCRIPTION OF THE DRAWINGS

FIG. 10 is a top view of a particular embodiment of the inventive earpiece in a first fixed configuration.

FIG. 11 is a bottom view of a particular embodiment of the inventive earpiece in a first fixed configuration.

FIG. 12 is a front view of a particular embodiment of the inventive earpiece in a first fixed configuration.

FIG. 13 is a back view of a particular embodiment of the inventive earpiece in a first fixed configuration.

FIG. 14 is a first side view of a particular embodiment of the inventive earpiece in a first fixed configuration.

FIG. 15 is a second side view of a particular embodiment of the inventive earpiece in a first fixed configuration.

FIG. 16 is cross section view 16-16 as shown in FIG. 9.

FIG. 17 is a cross section view 17-17 as shown in FIG. 12.

Figure 18:
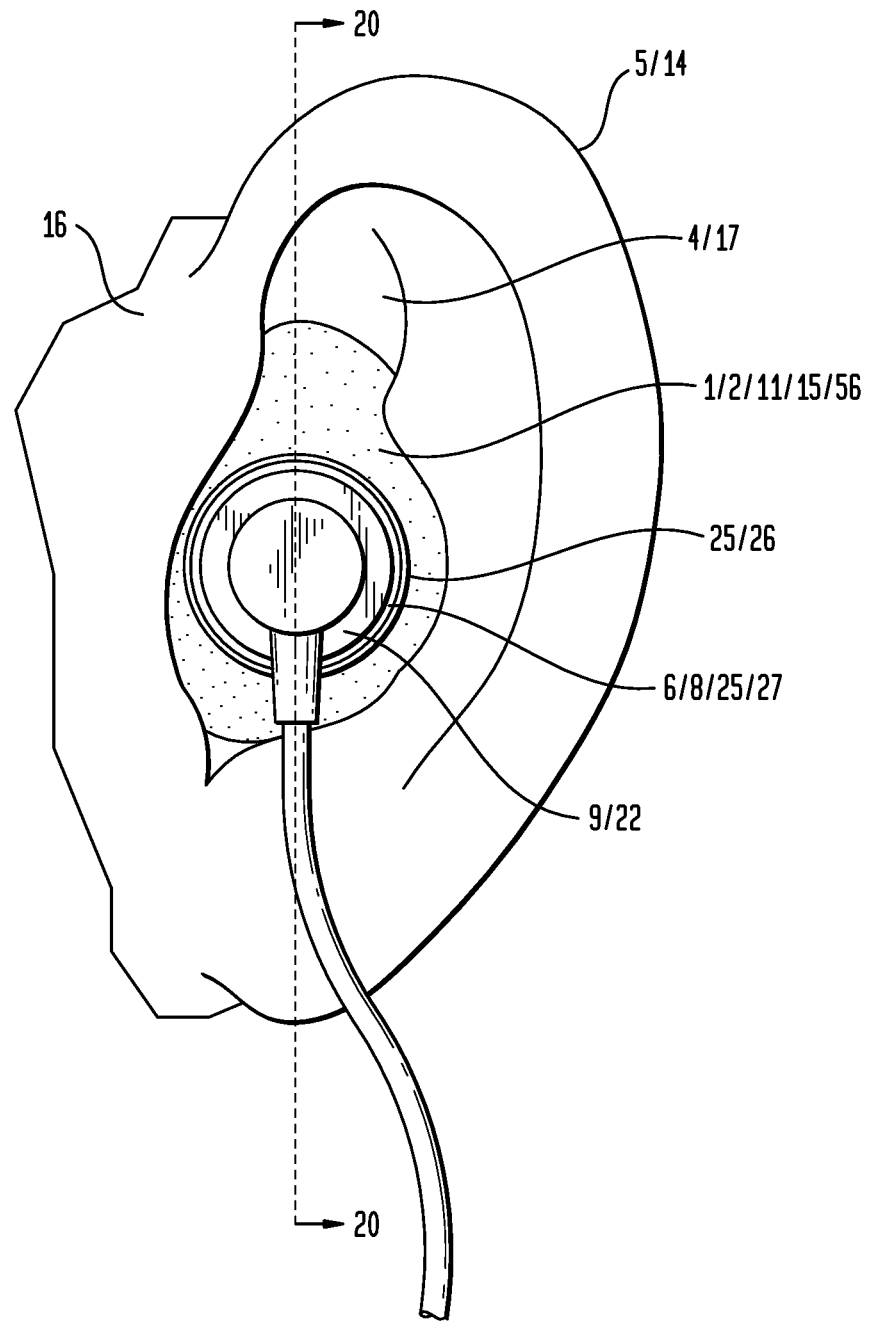

FIG. 18 is front view of the embodiments of the earpiece shown in FIGS. 10 through 17 and 19 through 28 in a second fixed configuration engaged within the outer ear and retaining a particular embodiment of an in-ear device.

Figure 19:
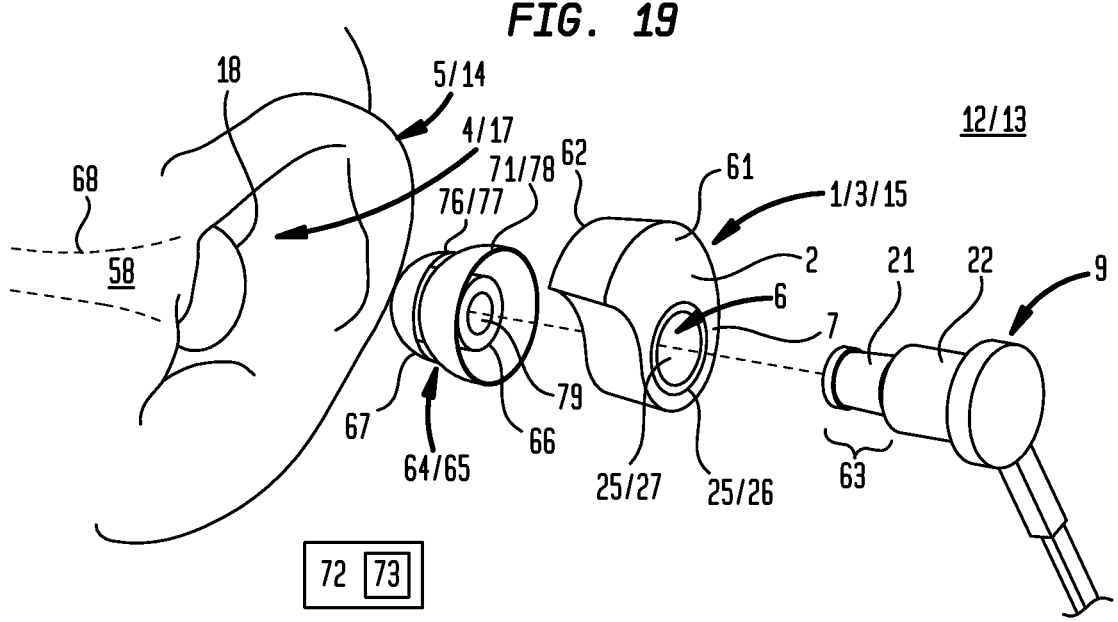

FIG. 19 is an exploded view of an embodiment of the earpiece in a first fixed configuration including a conduit having an external surface connected to the earpiece and an internal surface defining a passage in which the in-ear device is releasably retained with a portion extending outward of the earpiece which couples to an earplug.

Figure 20:
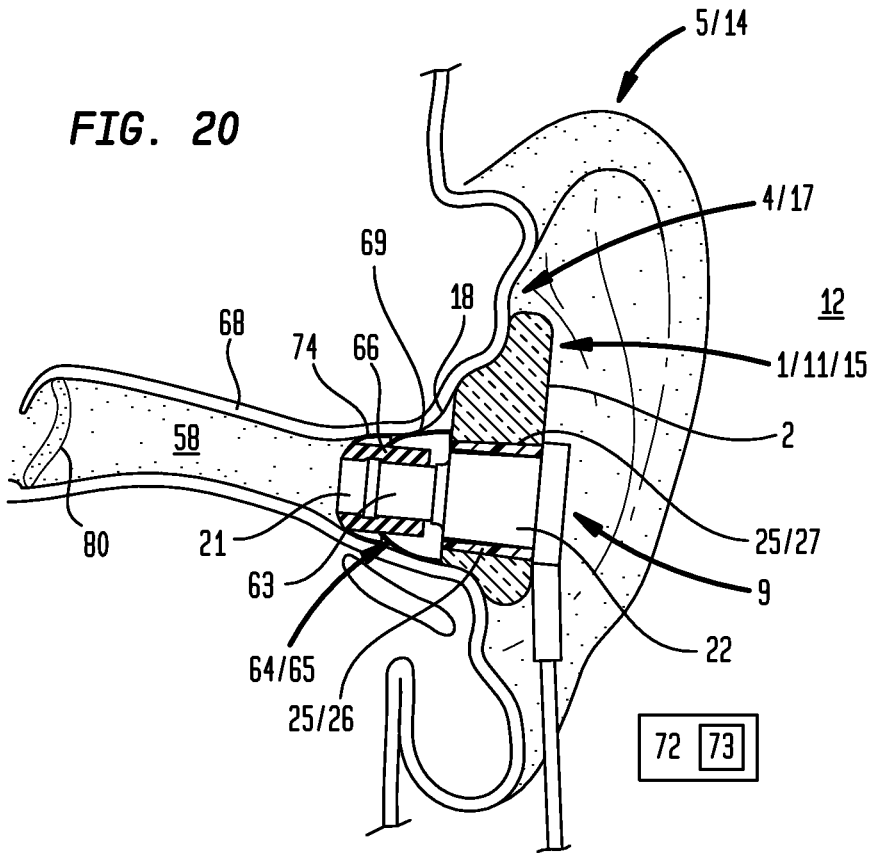

FIG. 20 is a cross section view of the ear which shows an embodiment of the earpiece of FIG. 27 in a second fixed configuration of the earpiece with the earplug conformed to the ear canal wall.

FIG. 21 is a top view of an embodiment of the earpiece in the first fixed configuration.

FIG. 22 is a bottom view of an embodiment of the earpiece in the first fixed configuration.

FIG. 23 is a first side view of an embodiment of the earpiece in the first fixed configuration.

FIG. 24 is a first end view of an embodiment of the earpiece in the first fixed configuration.

FIG. 25 is a second end view of an embodiment of the earpiece in the first fixed configuration.

FIG. 26 is a second side view of an embodiment of the earpiece in the first fixed configuration.

FIG. 27 is an exploded cross section view 20-20 of the exploded view of the embodiment shown in FIG. 19.

FIG. 28 is an enlarged a cross section view 20-20 of the assembled view of the embodiment shown in FIG. 20.

Figure 29:
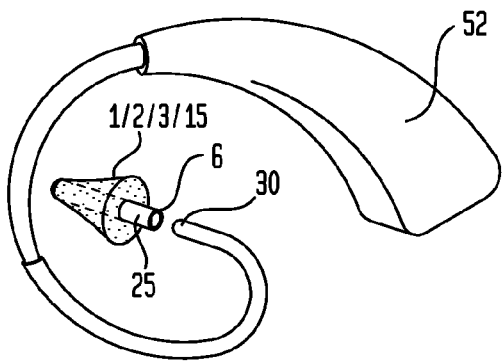

FIG. 29 is a front perspective view of a particular embodiment of the earpiece in a first fixed configuration having a conduit which extends outwardly to couple to an speaker tube of an apparatus worn outside the ear in the form of a hearing aid.

Figure 30:
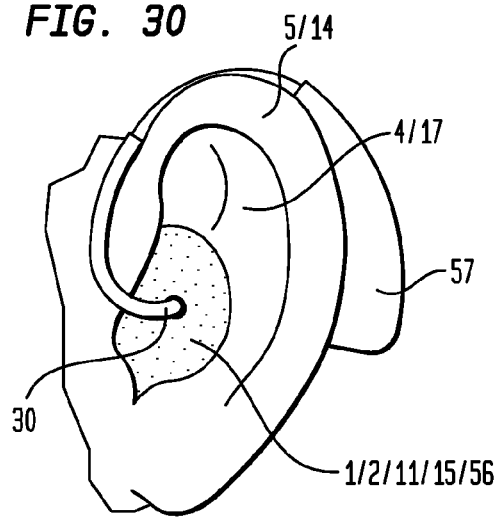

FIG. 30 is a front view of the embodiment of the earpiece in a second fixed configuration engaged within the outer ear and retaining the speaker tube shown in FIG. 19 of the hearing aid worn outside the ear.

Figure 31:
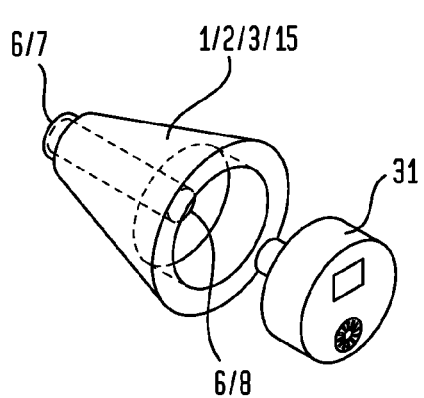

FIG. 31 is a front perspective view of an embodiment of the earpiece in a first fixed configuration adapted to retain a particular embodiment of an in ear device in the form of an in ear hearing aid.

Figure 32:
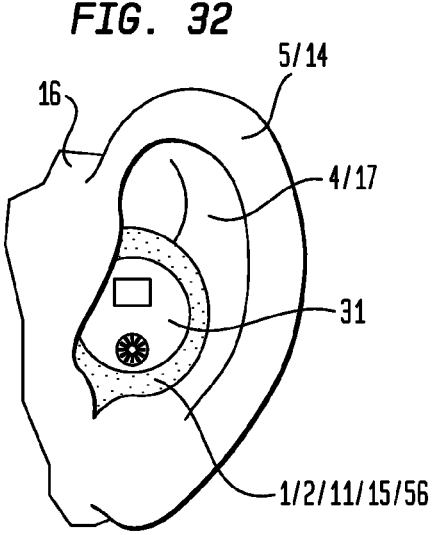

FIG. 32 is a front view of the embodiment of the earpiece shown in FIG. 21 in a second fixed configuration engaged within the outer ear and retaining the in ear hearing aid as shown in FIG. 21.

Figure 33:
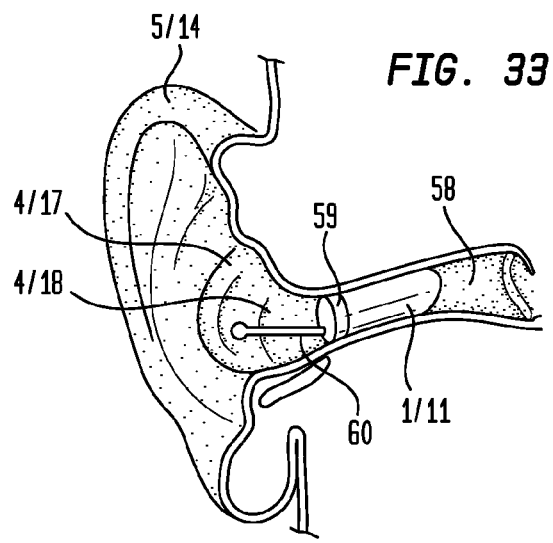

FIG. 33 is a cross section view of the ear which shows an embodiment of the earpiece in a second fixed configuration adapted to retain a particular embodiment of an in ear device in the form of an in ear canal hearing aid.

Figure 34:
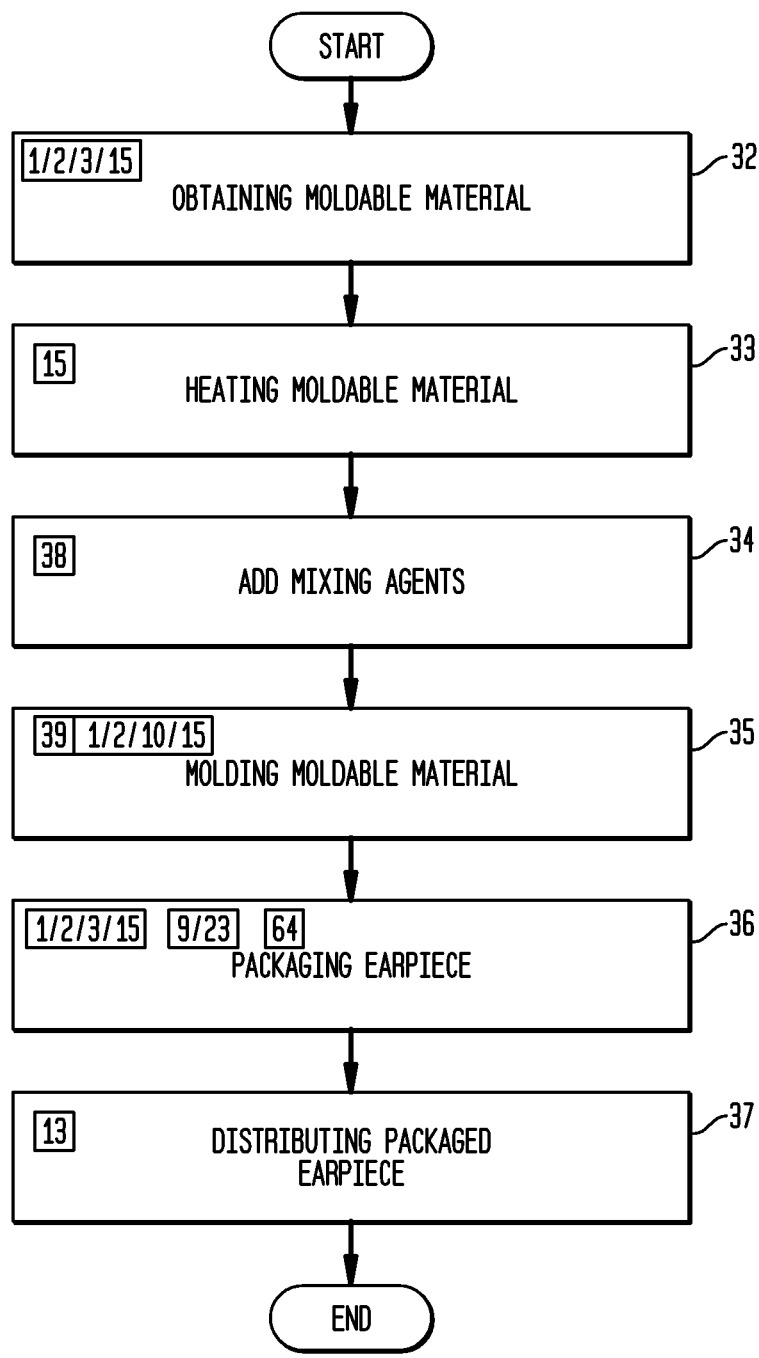

FIG. 34 is a block flow diagram of a method of providing a kit for an embodiment of a moldable earpiece system.

Figure 35:
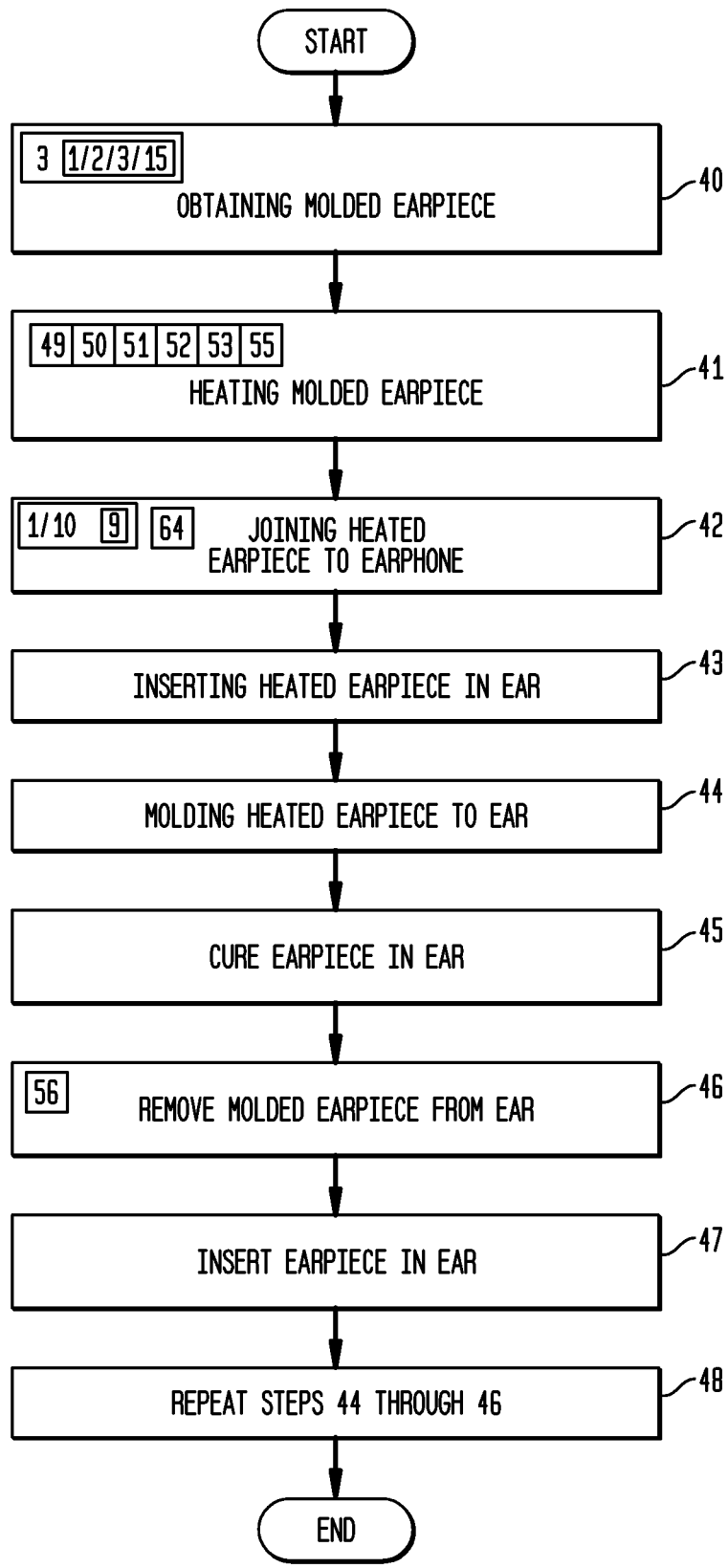

FIG. 35 is a block flow diagram of a method of sculpting an embodiment of a moldable earpiece system.

V. DETAILED DESCRIPTION OF THE PREFERRED EMBODIMENTS

Generally referring to FIGS. 1 through 8, which illustrate a generic embodiment of an inventive moldable earpiece (1) (also referred to as an "earpiece") having an external surface (2) disposed in a first fixed configuration (3) disposable within the outer ear (4) of an ear (5). The earpiece (1) having a passage (6) which communicates between a first location (7) and a second location (8) on the external surface (2) of the earpiece (1) and adapted for retention or releasable retention of an in ear device (9) in the earpiece (1). The earpiece (1) can be heated to achieve a moldable condition (10) which allows reconfiguration of the external surface (2) by engagement within the outer ear (4) and can be cooled while engaged with the outer ear (4) to dispose the external surface (2) in a second fixed configuration (11) conformed more closely to the configuration of the outer ear (4). As to particular embodiments, the earpiece (1) can be provided separate from but capable of use with one or more of a wide variety of in-ear devices (9), for example: earphones, earplugs, earbuds, ear tips, ear tubes, ear speakers, and in ear hearing aids, or the like. As to particular embodiments, the in-ear devices (9) can be a part of an apparatus (57) worn or which resides outside of the ear (5), for example: headsets, head phones, telephones, blue tooth headphones, wireless headphones, hearing aids, medical apparatus, or the like. As to other embodiments, the earpiece (1) and the in-ear device (9) can be provided in combination as part of a moldable earpiece system (12) or the earpiece (1) can be provided as part of a kit (13) which can be used by a wearer (14) for production of an earpiece (1) having greater conformity with the wearer's (14) outer ear (4) for retention or releasable retention of an in-ear device (9).

Embodiments of the moldable earpiece (1) having an external surface (2) disposed in the first fixed configuration (3) can be formed from an amount of moldable material (15). The term "moldable material" means for the purpose of this invention any material which retains a fixed configuration disposable within the outer ear (also referred to as the "first fixed configuration" (3)) at temperatures below about 40° C. (110° F.) and achieves a moldable condition (10) in a temperature range of about 40° C. (about 110° F.) and about 65° C. (150° F.) which allows the external surface (2) of the earpiece (1) to be reconfigured by engagement with the outer ear (4) and allows the passage (6) to be reconfigured by engagement with an in ear device (9) with the material remaining moldable at temperatures sufficiently low to avoid injury to the outer ear (4) or damage to the in-ear device (9) and which cures at ambient temperature or while engaged with the outer ear (4) to retain a fixed configuration conformed more closely to the configuration of the outer ear (4) (also referred to as the "second fixed configuration" (11)).

The amount of moldable material (15) can be one or more of, combinations of, or admixtures of one or more thermoplastic polymers suitable for use with the invention, such as: polyethylene, polypropylene, polyvinyl chloride (PVC), polystyrene, polyester, polycaprolactone, polytetrafluoroethylene, acrylonitrile butadiene styrene, or the like.

As one illustrative example, embodiments of the earpiece (1) can be formed from an amount of polycaprolactone polymer (CAS No.: 24989-41-4); however, other thermoplastic polymers suitable for use with embodiments of the invention can have physical properties as those described in Table 1 for polycaprolactone polymer, or similar physical properties which allow the material to be utilized in one or more of the embodiments of the earpiece (1).

As to the illustrative example, polycaprolactone polymers provide a biodegradable polyester with a molecular weight in the range of 37,000 grams per mole and 80,000 grams per mole each having a melting point of about 60° C. useful in making and using embodiments of the earpiece (1). Polycaprolactone polymers impart good water, oil, solvent, and chlorine resistance. Polycaprolactone polymers are also compatible with wide range of other materials (collectively referred to as "admixed agents" (38)), such as: starch to impart greater biodegradability; colorants, such as alcohol dyes or acrylic coloring agents; powders such as acrylic powder; particulates of plastic, copolymer plastics, metal, bismuth oxychloride, or glitter; or the like, either separately or in various combinations. Polycaprolactone polymers are non-toxic and approved by the United States Food and Drug Administration for specific applications in the human body.

Figure 1:
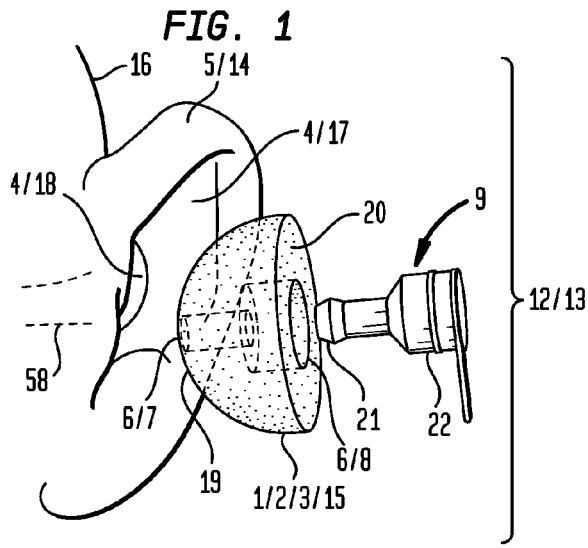
FIG. 1 is side perspective view which illustrates a step of a particular method of using an embodiment of the inventive earpiece in a first fixed configuration with a particular in-ear device in the form of an ear speaker.
Figure 2:
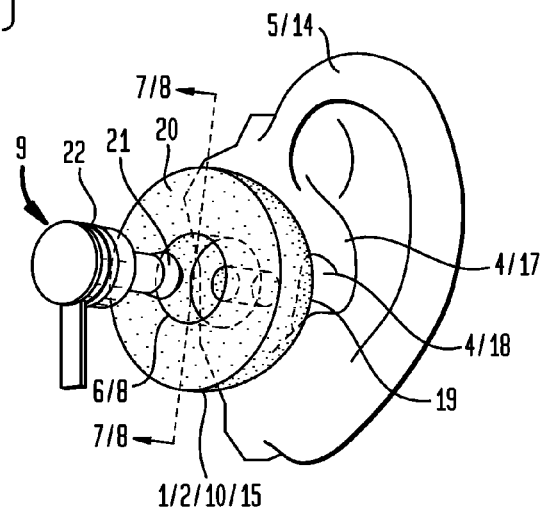
FIG. 2 is front perspective view which illustrates a step of a particular method of using an embodiment of the inventive earpiece in a first fixed configuration with the particular in-ear device shown in FIG. 1.
Figure 3:
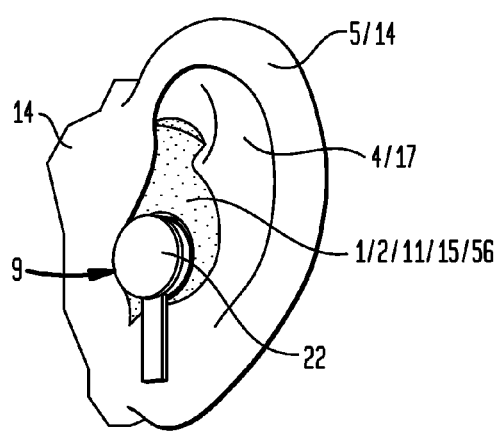
FIG. 3 is a front view which illustrates a step of a method of using an embodiment of the inventive earpiece in a second fixed configuration engaged to the particular in-ear device shown in FIG. 1.
Figure 4:
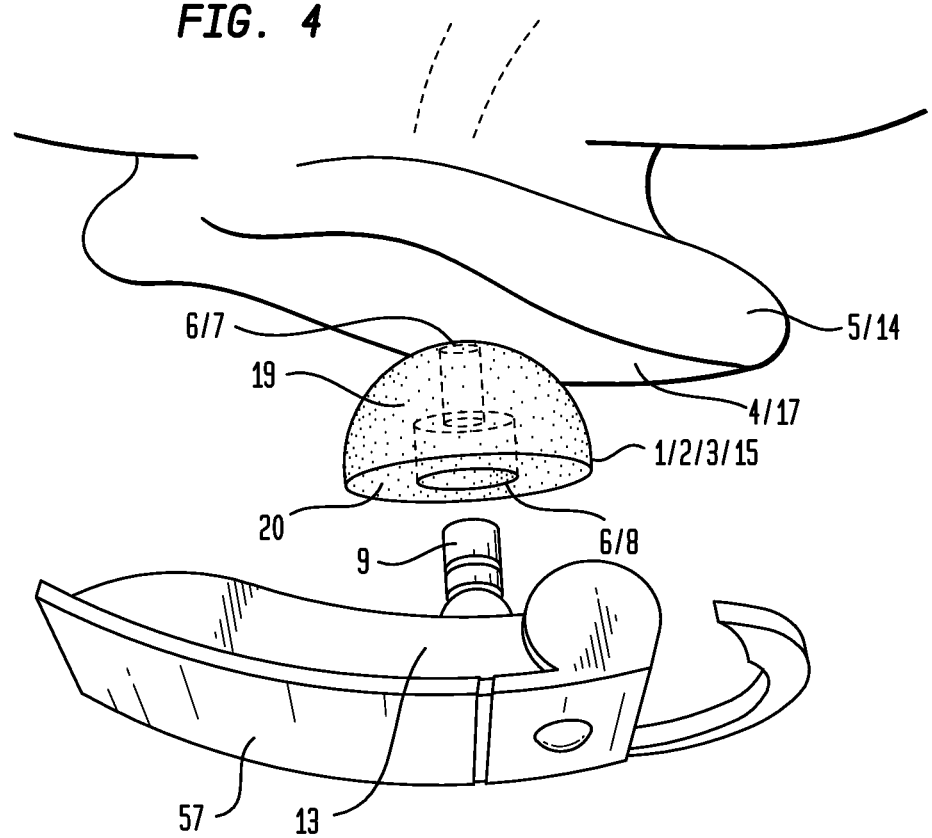
FIG. 4 is a top perspective view which illustrates a step of a method of using an embodiment of the inventive earpiece with a particular in-ear device which is part of an apparatus which resides outside the ear in the form of a hands free head set.

The term "outer ear" for the purposes of this invention includes the visible part of the ear that resides outside of the head (16) (also referred as the "auricle") which in part includes the outer ear bowl (17) and the outer portion of the open ear canal (18) (also referred to herein as the "concha") having skin that moves with that of the outer ear bowl (17)(as shown in the example of FIG. 2).

TABLE 1

Physical Properties of Polycaprolactone Thermoplastic Polymers

| Physical Property | ASTM Test | | | |
|---|---|---|---|---|
| Molecular Weight | | | | |
| Mn | GPC, THF, 25° C. | 37,000 ± 2000; | 47500 ± 2000; | 69000 ± 1500 |
| Mw | GPC, THF, 25° C. | | 84500 ± 1000; | 120000 ± 2000 |
| Mz | GPC, THF, 25° C. | | 130000 ± 5000; | 178500 |
| Polydispersity (Mw/Mn) | | | 1.78 | 1.74 |
| Melt Flow Index | | | | |
| 80° C., 2.16 kg, g/10 min | D 1238 | | 2.36 | 0.59 |
| 80° C., 21.6 kg, g/10 min | | | 34.6 | 9.56 |
| 190° C., 2.16 kg, g/10 min | | | 28 | 7.29 |
| Thermal Analysis (DSC) | | | | |
| Melting Point ° C. | | | 60-62 | 60-62 |
| Heat Of Fusion, DHm, J/g | | | 76.9 | 76.6 |
| Crystallinity, % | | | 56 | 56 |
| Crystallisation Temperature, ° C. | | | 25.2 | 27.4 |
| Glass Transition Temperature, Tg, ° C. | | | −60 | −60 |
| Tensile Properties | | | | |
| Yield Stress, s y, Mpa | D 412-87 | | | |
| 100 mm/min | | | 17.5 | 16 |
| 500 mm/min | | | 17.2 | 14 |
| Modulus, E. Mpa | D 412-87 | | | |
| 1 mm/min | | | 470 | 440 |
| 10 mm/min | | | 430 | 500 |
| Draw Stress, s d, MPa | D 412-87 | | | |
| 100 mm/min | | | 12.6 | 11.9 |
| 500 mm/min | | | 11.5 | 11 |
| Draw Ratio, l d, x | D 412-87 | | | |
| 100 mm/min | | | >4.2 | 4 |
| Stress At Break, s b, Mpa | D 412-87 | | | |
| 100 mm/min | | | 29 | 54 |
| Strain At Break, e b, % | | | | |
| 100 mm/min | D 412-87 | | >700 | 920 |
| Flexural Modulus, E, MPa | | | | |
| 2 mm/min | D 790 | | 411 | nd |
| Hardness | D 2240 | | | |
| Shore A | | | 95 | 94 |
| Shore D | | | 51 | 50 |
| Viscosity | | | | |
| Pa. sec, 70° C., 10 1/sec | | | 2890 | 12650 |
| Pa. sec, 100° C., 10 1/sec | | | 1353 | 5780 |
| Pa. sec, 150° C., 10 1/sec | | | 443 | 1925 |

The term "ear canal" for the purposes of this invention includes (58) from the outer portion of the open ear canal (18) to the ear drum (80).

Now referring primarily to FIGS. 1 through 18, particular embodiments of the earpiece (1) can be formed from an amount of moldable material (15) to provide an external surface (2) disposed in a first fixed configuration (3) disposable in the outer ear (4). The first fixed configuration (3) can provide a first portion (19) of the external surface (2) configured to allow or facilitate engagement with a part of the outer ear (4). As illustrative examples, embodiments can have the first portion (19) of the external surface (2) configured generally as a hemisphere (as shown in the examples of FIGS. 1, 2, 4 and 5) or configured generally in droplet shape or comma shape (as shown in the example of FIG. 10 through 15) or configured as a truncated cone (as shown in the examples of FIGS. 19 and 21); however, as to other embodiments, the first portion (19) of the external surface (2) can be configured in any other configuration which facilitates engagement of the earpiece (1) in the first fixed configuration (3) with a part of the outer ear (4), the outer ear bowl (17), or the outer portion of the ear canal (18).

The remaining second portion (20) of the external surface (2) can be formed in the first fixed configuration (3) to provide a generally flat surface (as shown in the examples of FIGS. 1, 2, 4, 5, 7, 8, 12, 19 and 21); although the second portion (20) of the external surface (2) in the first fixed configuration (3) can be configured in any form which allows the passage (6) adapted for retention or releasable retention of the in ear device (9) to communicate between a first location (7) and a second location (8) on said external surface (2) of said earpiece (1).

Figure 7:
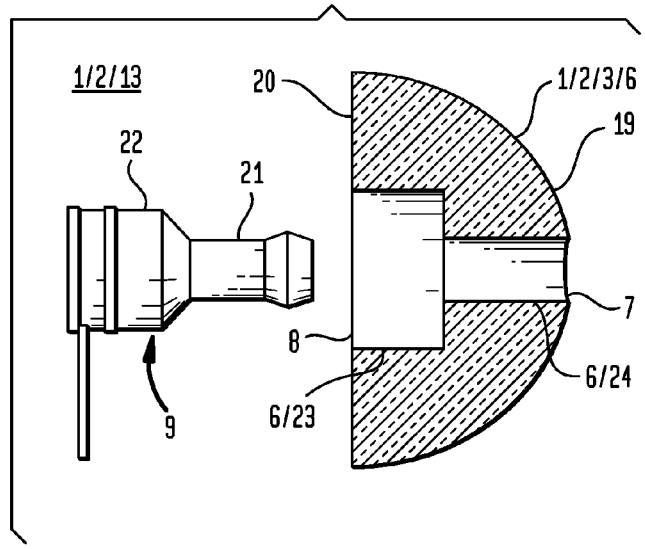
FIG. 7 is a cross section 7-7 of the particular earpiece shown in FIG. 2.
Figure 8:
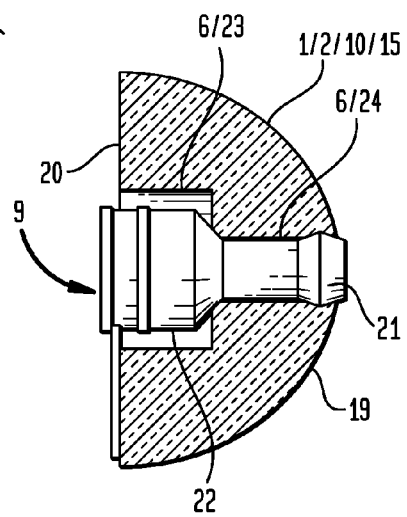
FIG. 8 is cross section 8-8 having the particular earpiece shown in FIGS. 2 and 7 engaged with the in-ear device shown in FIG. 7.
Figure 9:
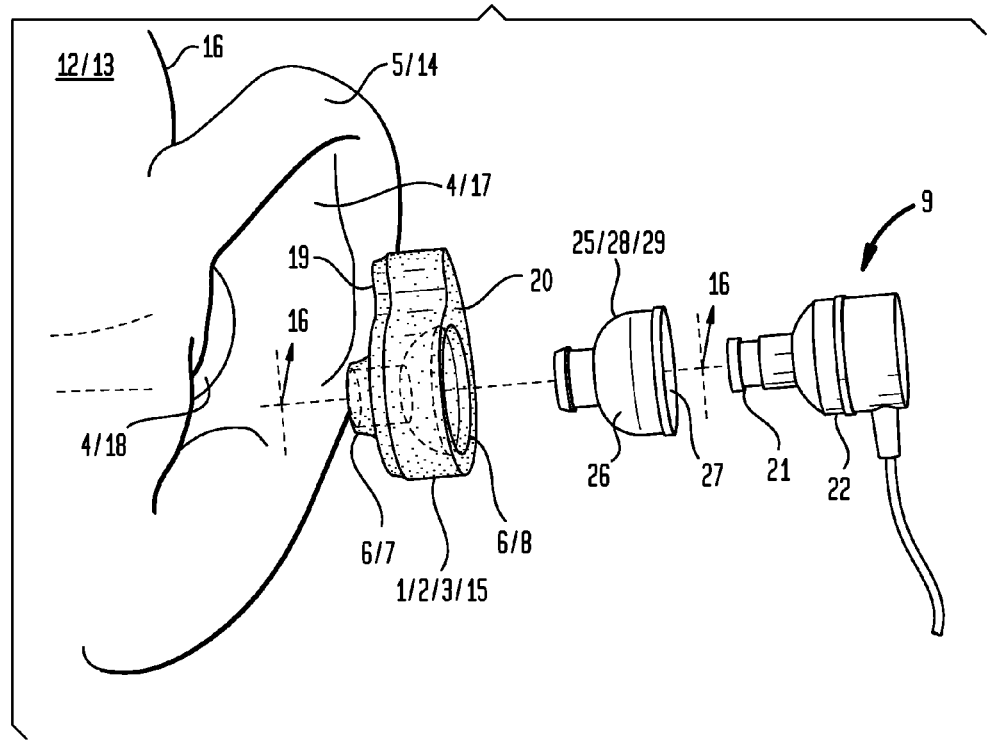
FIG. 9 is an exploded perspective side view of a particular embodiment of the inventive earpiece in a first fixed configuration having a passage into which a conduit removably inserts to provide an internal surface configured to retain an in ear device.

Now referring primarily to FIGS. 7, 8 and 17, the passage (6) which communicates between a first location (7) on the first portion (19) and a second location (8) on the second portion (20) of the external surface (2) and can be configured to receive the in ear device (9) at a location within the passage (6) to position a sound delivery element (21) proximate the first location (7) of the external surface (2) of the earpiece (1) and position the body (22) of the in ear device (9) proximate the second location (8) of the external surface (2). The passage (6) can be configured in a wide variety of structural forms to receive a correspondingly wide variety of structural forms of the in ear device (9). As shown in the example of FIGS. 7 and 8, where the in ear device (9) has a generally cylindrical structure, the passage (6) can define a corresponding generally cylindrical volume, or as further shown in the example of FIGS. 7 and 8 where the body (22) of the in ear device (9) has a greater diameter than the sound delivery element (21) the passage (6) can correspondingly provide a first passage portion (23) of greater diameter than a second passage portion (24) for retention or releasable retention of the in ear device (9) within the passage (6). The earpiece (1) can have an external surface (2) in the first fixed configuration (3) which engaged with the outer ear (4) substantially aligns the passage (6) with the ear canal (18).

Now referring primarily to FIGS. 9 through 18, embodiments of the inventive earpiece (1) can further include a conduit (25) which defines the passage (6) which communicates between the first location (7) and the second location (8) on said external surface (2) of the earpiece (1). The conduit (25) can have a conduit external surface (26) which engages the moldable material (15) of the earpiece (1) and a conduit internal surface (27) which defines a configuration of the passage (6) adapted for retention or releasable retention of the in ear device (9) in the earpiece (1). The configuration of the conduit internal surface (27) of the conduit (25) can vary between embodiments to retain or releasably retain a wide variety of configurations of the in ear device (9).

As to particular embodiments, the conduit (25) can take the form of an elastomer layer (28) formed integral with the amount of moldable material (15) to provide a one-piece conduit earpiece (1)(as shown in the examples of FIGS. 10 through 11) with the elastomer layer (28) providing the conduit internal surface (27) defining the configuration of the passage (6)(as shown by the example shown in FIG. 17).

As to other particular embodiments, the conduit (25) can take the form of a flexible elastomer insert (29) which removably couples within the passage (6) the earpiece (1) with the the flexible elastomer insert (29) providing the conduit internal surface (26) defining the configuration of the passage (6) to retain or releasable retain the in ear device (9) in the earpiece (1). A plurality of flexible elastomer inserts (28) each having substantially the same configuration of the conduit external surface (26) can provide a plurality of different configurations of the conduit internal surface (27) to retain or releasably retain a corresponding plurality of different configurations of the in ear device (9) by interchanging the conduit (25) removably coupled within the passage (6) to provide in one earpiece (1) a plurality of different configurations of the conduit internal surface (27).

Additionally, the conduit (25) can be provided with sufficient structural rigidity to maintain the configuration of the passage (6) for retention or releasable retention of the in ear device (9) even in the moldable condition (10) of the earpiece (1).

Now referring primarily to FIGS. 19 through 28, as to particular embodiments of the moldable earpiece (1), the earpiece (1) can have a passage (6) which communicates between a first location (7) and a second location (8) on the external surface (2) of the earpiece (1) (as shown in the illustrative example of FIGS. 21 through 26 the passage communicates between opposed faces (61)(62) of the earpiece (1) in the first fixed configuration (3)). The passage (6) can be configured to releasably retain an in-ear device (9) in the passage (6) with a portion (63) of the in-ear device (9) extending outwardly from the earpiece (1) for insertion into the ear canal (58) of the ear (4) (as shown in the illustrative example of FIG. 20). An earplug (64) can be coupled or directly coupled to the portion (63) of the in-ear device (9) extending from the earpiece (1) (as shown in the illustrative examples of FIGS. 20 and 28). The earplug (64) can have an earplug external surface (65) configured to engage the ear canal wall (68) defining the ear canal (58)(as shown in the illustrative example of FIG. 20).

Now referring primarily to FIGS. 19, 26 and 27, an illustrative example of an earplug (64) suitable for use with embodiments of the invention includes an elongate tubular core (66) defining an earplug passage (79) through which the portion (63) of the in-ear device (9) extending outward from the earpiece (1) passes to couple or directly couple the earplug (64) to the in-ear device (9) with the earplug (64) positioned adjacent the earpiece (1)(as shown in the example of FIG. 28) and can further include a sound attenuating portion (67) connected or directly connected to the elongate tubular core (66). The sound attenuating portion (63) can be configured to conformably engage the ear canal wall (68) of the ear (4). While the illustrative example of the ear plug (64) includes a sound attenuating portion (67) having at least one flexible convex annular member (69) having an internal concentric edge (70) circumferentially joined to the elongate tubular core (66) and with the flexible convex annular member (69) outwardly radially extending from the elongate tubular core (65) to terminate at an external concentric edge (71); however, it is not intended that the earplug (64) be configured solely in this structural form. Rather, the illustrative example is intended to enable a person of ordinary skill in the art to make and use a wide variety of earplugs (65) that can be coupled, directly coupled or joined to the portion (63) of an in-ear device (9) extending outward of the earpiece (1) which can be inserted into the ear canal (58) to conformingly engage with the ear canal wall (68) of the ear (4) to act as a barrier between the ear canal (58) and the ambient environment (72) outside of the ear (4) to attenuate or reduce sound (73) from the ambient environment (72) transmitted to the ear canal (58). Accordingly, the earplug (65) can be made from a wide variety of conforming structures or conforming materials such as a resilient compressible material having a first structural condition which upon application of force assumes a second structural condition having a reduced volume and upon release of applied force returns toward the first structural condition, such as compressible foam, sponge, glass down, or the like.

As to particular embodiments of the sound attenuating portion (67) of the earplug (64), the at least one flexible convex annular member (69) comprises a pair of flexible convex annular members (69)(74) having a corresponding pair an internal concentric edges (70)(75) circumferentially joined in spaced apart relation along the elongate tubular core (66). The pair of flexible convex annular members (69)(74) can each outwardly radially extend from said elongate tubular core (66) to terminate at a corresponding pair of external concentric edges (71)(76) with a first one of the pair of external concentric edges (71) having a lesser diameter (77) than the second one of the pair of external concentric edges (76) which has a greater diameter (78). While the illustrative example of the earplug (64) shown in FIGS. 19, 26, and 27 has a pair of flexible convex annular members (69)(74); this is not intended to necessarily limit embodiments to a pair of flexible convex members (69)(70). Rather embodiments of the earplug (64) can have one, two, three, or more flexible convex annular members depending upon the application.

Now referring primarily to FIGS. 20 through 25, particular embodiments of the invention can further include a conduit (25) which communicates between a first location (7) and a second location (8) on said external surface (2) (or opposed faces (61)(62)) of the earpiece (1) (as shown in the illustrative examples of FIGS. 23 and 26). The conduit (25) can have a conduit external surface (26) which connects or directly connects to the earpiece (1) and an conduit internal surface (27) which defines the passage (6) through which the in-ear device (9) passes (as shown in the illustrative examples of FIGS. 19 through 28). The conduit internal surface (27) can be configured to releasably retain the in-ear device (9) in the passage (6) with the portion (23) of the in-ear device (9) extending outward from the earpiece (1) (as shown in the illustrative examples of FIGS. 27 and 28). As to particular embodiments, the conduit (25) and the earpiece (1) can be molded as one piece with the earpiece (1) having an external surface (2) disposed in a first fixed configuration (3)(as shown in the examples of FIGS. 21 through 26). The first fixed configuration (3) can be disposable within the outer ear (4) of an ear (5) to facilitate reconfiguration of the earpiece (1) in the moldable condition (10) by engagement with the outer ear (4), as above described.

As to the particular embodiments shown in FIGS. 21 through 26, the conduit (25) can be made of a material sufficiently rigid at temperatures which achieve the moldable condition (10) of the earpiece (1) (between about 40° C. (about 110° F.) and about 65° C. (150° F.)) to retain the configuration of the conduit internal surface (27), thereby allowing the earpiece (1) to achieve the moldable condition (10) and allow reconfiguration of the external surface (2) by engagement with said outer ear (4) without deforming the conduit internal surface (27) or altering the open space within the passage (6). Accordingly, after the earpiece (1) cools while engaged with the outer ear (4) disposing the external surface (2) in the second fixed configuration (11), the conduit internal surface (27) remains configured to realeasably retain the in-ear device (9) and allow coupling of the earplug (64) to the portion (23) extending beyond the earpiece (64), as above described.

Now referring primarily to FIG. 28, the earpiece (1) in the second fixed configuration (11) having the in-ear device (9) retained within the conduit (25) and having the earplug (64) coupled to the portion (23) of the in-ear device (9) extending outward of the earpiece (1) can be inserted into the ear (5) of the wearer (14) to engage the earpiece (1) in the second fixed configuration (11) with the outer ear (4) and having the earplug (64) conformably engaged with the ear canal wall (68).

Now referring primarily to FIGS. 29 and 30, particular embodiments of the conduit (25) can be configured to extend outwardly from the earpiece (1) to couple to a speaker tube (30) (also referred to as "hearing aid tube") of a hearing aid (31) worn outside of the ear (5) (or couple to a similar sound conveyance structure). The earpiece (1) can be configured as above described to provide an external surface (2) formed in a first fixed configuration (3). The earpiece (1) can be heated to achieve the moldable condition (10) of the external surface (3) which can be engaged to the outer ear (4) and cooled to provide the second fixed configuration (11) of the earpiece (1) with the conduit (25) extending a sufficient distance outward of the second portion (20) of the external surface (3) to couple the speaker tube (30)(as shown in the example of FIG. 20).

Now referring primarily to FIGS. 31 and 32, a similar embodiment of the earpiece (1) provide an external surface (2) formed in the first fixed configuration (3)(as shown in the example of FIG. 21) having a passage (6) configured to retain or releasably retain an in ear device (9) in the form of an in ear hearing aid (31). The earpiece (1) can be heated to achieve the moldable condition (10) of the external surface (2) which can be engaged to the outer ear (4) and cooled to provide the second fixed configuration (11) of the earpiece (1) with the passage (6), or the conduit (25) having a conduit internal surface (27) defining the configuration of the passage (6), which retains or releasably retains the in-ear hearing aid (31)(as shown in the example of FIG. 22).

Now referring primarily to FIG. 33, particular embodiments of the invention having a first fixed configuration (3) similar to that shown in FIG. 21 can be utilized to retain an in ear canal hearing aid (59) as above defined and as shown in FIG. 23. The particular embodiments of the first fixed configuration (3) utilized with in ear canal hearing aids (59) further include an earpiece withdrawal element (60) which can be in the form of a stiff member or a flexible cord depending upon the application.

Now referring primarily to FIG. 34, embodiments of the invention can provide a kit (13). The kit (13) can be produced by obtaining an amount of moldable material (15) (as shown in step (32)), having physical properties as or similar to those above described or useful in making or using embodiments of the invention as described, such as a polycaprolactone polymer. The amount of moldable material (15) can be sufficiently heated (as shown in step (33)) to allow, if desired, admixing of one or more admixed agents (38) (as shown in step (34)) to alter one or more physical properties of the amount of moldable material (15) depending upon the application. The amount of moldable material (15) (whether or not, the amount of moldable material (4) includes one or more admixed agents (38)) can be sufficiently heated in step (33) to allow molding of the earpiece (1) (whether in a mold (39) or otherwise formed)(as shown in step (35)) having an external surface (2) in the first fixed configuration (3) disposable within the outer ear (4) of an ear (5) and having a passage (6) which communicates between a first location (7) and a second location (8) on the external surface (2) of the earpiece (1) for retention of an in ear device (9).

For example, polycaprolactone polymers can be obtained (step 32) and heated to about 65° C. (150° F.)(step 33) to allow admixing with one or more admixed elements (6) (step 34) and molding an amount of the polycaprolactone polymers in a mold (39) (step 35) to produce the earpiece (1) having an external surface in the first fixed configuration (3). The earpiece (3) can be cooled to room temperature (or below about 40° C. (110° F.) to maintain the configuration imparted by the mold (39).

Production of the kit (13) can further include packaging of the earpiece (1) (as shown in step (36)) separate of any in-ear device (9) or in combination with an in-ear device (9). As to particular embodiments, the in-ear device (9) can be configured to be releasably retained within the passage (6) with a portion (23) of the in-ear device (9) extending outward of the earpiece (1). The kit (13) can further include an earplug (64) configured to couple to the portion (23) of the in-ear device (9) and having an sound attenuation portion (67) configured to conformably engage the ear canal wall (68)(as shown in the example of FIG. 28). Subsequent distributing of the kit (13) (as shown in step (37)) allows a plurality of earpiece wearers (14) access to a plurality of earpieces (1) having an external surface (2) that can be reconfigured from a first fixed configuration (3) to a second fixed configuration (11) having greater conformity with the wearer's (14) outer ear (4) for retention or releasable retention of an in-ear device (9).

Now referring primarily to FIG. 35, which provides block flow diagram of using embodiments of the inventive earpiece (1) whether or not obtained as a kit (13), or whether obtained with or separate from an in ear device (9). A first step includes obtaining an earpiece (1) having an external surface (2) disposed in a first fixed configuration (3) disposable within the outer ear (4) of an ear (5) and having a passage (6) which communicates between a first location (7) and a second location (8) on the external surface (2) of the earpiece (1) and adapted to retain or releasably retain an in ear device (9) in said earpiece (1)(as shown in step (40) and as shown in the examples of FIGS. 1, 2, 4, 7, 10 through 17, 19, 26, 27 and 31,).

A second step includes heating the earpiece (1) to achieve a moldable condition (10) which allows reconfiguration of the external surface (2) (as shown in step 41). Heating to achieve the moldable condition (10) of the earpiece (1) as obtained in step (40) can be accomplished in a variety of ways. As a first illustrative example, the moldable earpiece (1) can be located in a heated enclosure (49). Where the earpiece (1) in the first fixed configuration (3) is formed from polycaprolactone (or other material(s) have same or similar physical properties), the moldable earpiece (1) can be heated within the heated enclosure (49) having sufficient temperature to achieve the molded condition (10). As to particular embodiments, the heated enclosure (49) can have a temperature maintained at about 70° C. (160° F.) and the earpiece (1) can be heated within the heated enclosure (49) for about 10 minutes. The moldable earpiece (3) can be removed from the heated enclosure (49) and allowed to sufficiently cool for engagement with the outer ear (4) (typically about 30 seconds).

As a second illustrative example, the moldable earpiece (1) can be located in an amount of liquid (50). The amount of liquid (50) can be any liquid which does not degrade the moldable material (15) of the earpiece (1) and which can hold a temperature sufficient to heat the earpiece (1) to achieve the moldable condition (10), such as an oil, alcohol, water, or the like, or combinations thereof. Typically, the amount of liquid (50) will be an amount of water (51). The amount of liquid (50) can be sufficiently heated to achieve the moldable condition (10). For example, where the moldable earpiece (3) is made from polycaprolactone polymer, the earpiece (1) can be heated in an amount of water (50) to a temperature of about 60° C. (140° F.) for about 5 minutes. The earpiece (1) can be removed from the heated water (50) and allowed to sufficiently cool for engagement with the outer ear (4) (typically about 30 seconds). As to particular embodiments, the earpiece (1) in the first fixed configuration (3) of the external surface (2) disposed in the amount of liquid (50) can be heated by exposing the earpiece (1) disposed in said amount of liquid (50) to an amount of microwave radiation (51) sufficient to achieve the moldable condition (10). As to particular embodiments, the earpiece (1) can be exposed to an amount of microwave radiation (51) sufficient to achieve the moldable condition (10).

As a third illustrative example, the earpiece (1) can be located in a flow of heated fluid (52). The flow of heated fluid (52) can be a flow of heated air (53); although the invention is not so limited. As to particular embodiments of the earpiece (3) made from polycaprolactone polymer (or other material have the same or similar physical properties), a flow of sufficiently heated air (53) can be obtained from conventional hair dryer (54). The settings of the hair dryer (55) as to temperature and flow rate can be adjusted to allow the earpiece (1) to be sufficiently heated to achieve the moldable condition (10), typically, within a period of about one minute to about 2 minutes. The earpiece (1) can be removed from the flow of heated air (53) and allowed to sufficiently cool for engagement with the outer ear (4) (typically about 30 seconds). The above illustrative examples are not intended to be limiting with respect to the method of heating the moldable earpiece (1) and other methods of heating the moldable earpiece (1) can be utilized, including, for example, a sand bath or salt bath.

Figure 5:
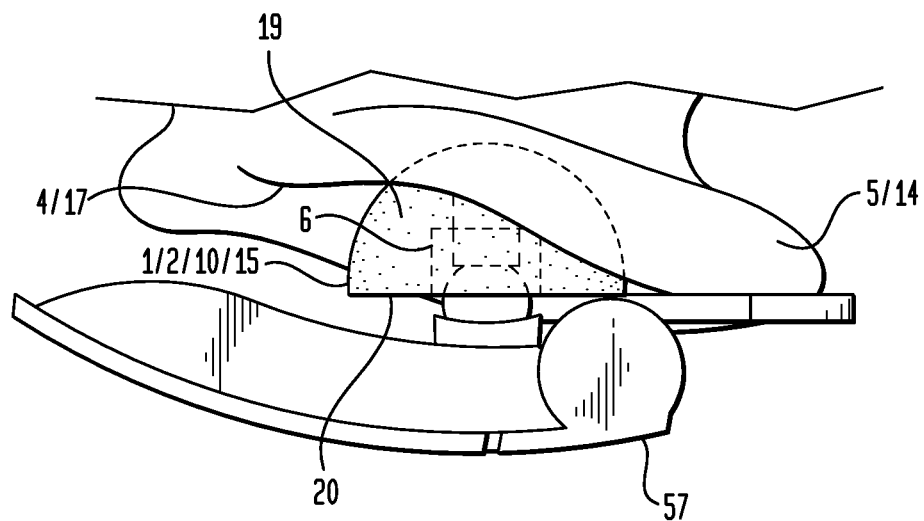
FIG. 5 is a top view which illustrates a step of a method of using an embodiment of the inventive earpiece in a first fixed configuration engaged to the particular in-ear device shown in FIG. 4.
Figure 6:
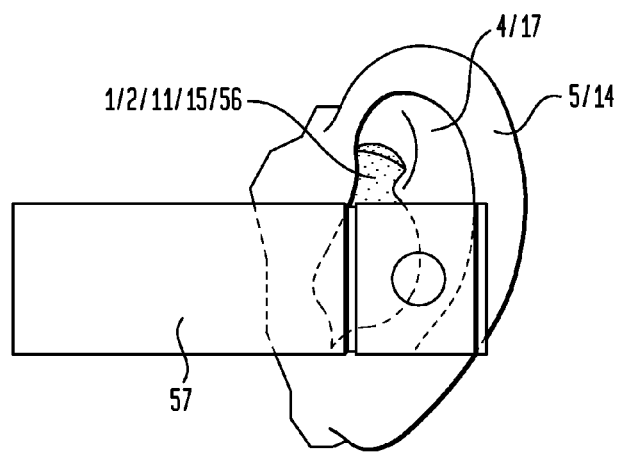
FIG. 6 is a front view which illustrates a step of a method of using an embodiment of the inventive earpiece in a second fixed configuration engaged to the particular in-ear device shown in FIG. 4.

Again referring primarily to FIG. 35, by disposing the in-ear device (9) into the passage (6) of the earpiece (1) in the moldable condition (10)(as shown in step 42 and as shown in the examples of FIGS. 5 and 8), the wearer (14) can forcibly urge the moldable material (15) of the earpiece (1) in contact with the in-ear device (9) to reconfigure the passage (6) to retain or releasably retain the in-ear device (9) in the earpiece (1). As to particular embodiments, by disposing the in-ear device (9) in a conduit (25) (as shown in the examples of FIGS. 17, 19, 26 and 27) the wearer can maintain the configuration of the passage (6) defined by the conduit internal surface (27) to retain or releasably retain the in-ear device (9) in the earpiece (1). As to particular embodiments, a portion (23) of the in-ear device (9) retained within the passage (6) of the earpiece (1) in the second fixed configuration (11) can extend outwardly of the earpiece (1). The wearer (14) can couple an earplug (64) to the portion (23) of the in-ear device (9) extending outwardly of the earpiece (1).

Again referring primarily to FIG. 35, the earpiece (1) in the moldable condition having the in-ear device (9) retained in the passage (6) can be disposed in the outer ear (4) aligning the sound delivery element (21) of the in-ear device (9) with the outer portion of the ear canal (18)(as shown in step 43 and in the examples of FIGS. 2 and 5) compressibly conforming the earplug (64) to the ear canal wall (68). The earpiece (1) engaged with the outer ear (4) and having the sound delivery element (21) in alignment with the outer portion of the ear canal (18) with the earplug (64) conformingly engaged with the ear canal wall (68) can be molded (as shown in step (44)) by forcible urging of the fingers (56) to reconfigure the external surface (2) of the earpiece (1) to more closely conform to the engaged part of the outer ear (4) (as shown in the examples of FIGS. 3, 6, 18, 28, 30, and 32).

Again referring primarily to FIG. 35, once the earpiece (1) has been molded by engagement with the outer ear (4), the earpiece (1) engaged with the outer ear (4) can be allowed to cool to ambient temperature, or sufficiently cool to achieve the second fixed condition (11) of the external surface (2) of the earpiece (1) which more closely conforms to the engaged part of the outer ear (4) (as shown by step 45). Typically, sufficient cooling can be achieve in a period of about five minutes to about ten minutes. Cooling allows the earpiece (1) to cure in a second fixed configuration (11) which conforms to the outer ear (4) of the wearer (14). During the cooling, the wearer (14) should not talk or otherwise move the mouth or face. The earpiece (1) can then be removed from the out ear (4) of the wearer (14) (as shown as step (41)). The earpiece (1) in the second fixed configuration (11) can be re-inserted into the outer ear (4) and removed from the outer ear (4) as desired (shown as steps (46) and (47). Additionally, steps 41 through 46 can be repeated to re-configure the external surface of the earpiece (1).

As can be easily understood from the foregoing, the basic concepts of the present invention may be embodied in a variety of ways. The invention involves numerous and varied embodiments of a moldable earpiece (1) or moldable earpiece system (12) which can be utilized for the production of a molded earpiece (56) by the process above described.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a moldable earpiece" should be understood to encompass disclosure of the act of "molding an earpiece"—whether explicitly discussed or not—and, conversely, were there effectively disclosure of the act of "molding an earpiece", such a disclosure should be understood to encompass disclosure of "a moldable earpiece" and even a "means for molding an earpiece." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a light source" refers to one or more of those light sources. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. The term "about" generally refers to a range of numeric values that one of skill in the art would consider equivalent to the recited numeric value or having the same function or result.

Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Thus, the applicant(s) should be understood to claim at least: i) each of the moldable earpieces herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A moldable earpiece for an in-ear device, comprising:
    an earpiece having an external surface disposed in a first fixed configuration disposable within the auricle of an ear, said earpiece heatable to achieve a moldable condition which allows reconfiguration of said external surface by engagement with said auricle, said earpiece coolable while engaged with said auricle to dispose said external surface in a second fixed configuration;
    a conduit having first and second open ends which communicate between a first location and a second location on said external surface of said earpiece, said conduit having a conduit external surface engaged with said earpiece and a conduit internal surface which defines a passage, said conduit internal surface having a configuration which releasably retains an in-ear device in said passage, said conduit internal surface retaining said configuration which releasably retains said in-ear device at temperatures which achieve said moldable condition of said earpiece; and
    an earplug coupled to said in-ear device releasably retained by said conduit internal surface within said passage, said earplug having an earplug external surface configured to engage an ear canal wall defining said ear canal.

2. The moldable earpiece of claim 1, wherein said earpiece maintains said external surface in said first fixed configuration or said second fixed configuration at a temperature below about 40° C. (110° F.) and wherein said earpiece maintains said moldable condition at a temperature of between about 40° C. (about 110° F.) and about 65° C. (150° F.).

3. The moldable earpiece of claim 2, wherein said earpiece comprises an amount of polycaprolactone polymer having a number average molecular weight in the range of about 37,000 grams per mole and about 80,000 grams per mole.

4. The moldable earpiece of claim 3, wherein said earpiece achieves said moldable condition by heating said earpiece for a period of time within a heated enclosure maintained at about 70° C. (160° F.).

5. The moldable earpiece of claim 3, wherein said earpiece achieves said moldable condition by exposure of said earpiece for a period of time to an amount of microwave radiation.

6. The moldable earpiece of claim 3, wherein said earpiece achieves said moldable condition by disposal in an amount of liquid having temperature of between about 40° C. (about 110° F.) and about 65° C. (150° F.).

7. The moldable earpiece of claim 3, wherein said earpiece achieves said moldable condition by disposal in an amount of liquid, said earpiece disposed in said amount of liquid exposed to an amount of microwave radiation.

8. The moldable earpiece of claim 7, wherein said amount of liquid comprises an amount of water.

9. The moldable earpiece of claim 3, wherein said earplug further comprises:
    an elongate tubular core defining an earplug passage through which said portion of said in-ear device extending into said ear canal passes; and
    a sound attenuating portion directly connected to said elongate tubular core, said sound attenuating portion configured to conformably engage said ear canal wall of said ear.

10. The moldable earpiece of claim 9, wherein said sound attenuating portion further comprises at least one flexible convex annular member having an internal concentric edge circumferentially joined to said elongate tubular core, said flexible convex annular member outwardly radially extending from said elongate tubular core to terminate at an external concentric edge.

11. The moldable earpiece of claim 10, wherein said a least one flexible convex member comprises a pair of flexible convex annular members each having an internal concentric edge circumferentially joined in spaced apart relation along said elongate tubular core, said pair of flexible convex annular members each outwardly radially extending from said elongate tubular core to terminate at a corresponding pair of external concentric edges, a first of said pair of external concentric edges having lesser diameter than said second of said pair of external concentric edges.

12. The moldable earpiece of claim 3, wherein said in-ear device is a part of an apparatus which resides outside of said ear.

13. The moldable earpiece of claim 12, wherein said apparatus is selected from the group consisting of: headsets, head phones, telephones, blue tooth headphones, wireless headphones, and hearing aids.

* * * * *